US007630352B2

(12) United States Patent
Leung et al.

(10) Patent No.: US 7,630,352 B2
(45) Date of Patent: Dec. 8, 2009

(54) SUPPORT MOBILE DEVICE IN ASYMMETRIC LINK ENVIRONMENT

(75) Inventors: Kent K. Leung, Los Altos, CA (US); Alpesh S. Patel, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 11/646,230

(22) Filed: Dec. 26, 2006

(65) Prior Publication Data

US 2007/0104170 A1    May 10, 2007

Related U.S. Application Data

(63) Continuation of application No. 09/752,884, filed on Dec. 28, 2000, now Pat. No. 7,295,551.

(51) Int. Cl.
*H04W 4/00* (2009.01)
*H04M 3/00* (2006.01)

(52) U.S. Cl. ........................ 370/338; 455/418

(58) Field of Classification Search ................. 455/418, 455/557, 435–439, 442, 466, 445, 426; 370/338, 370/349, 352–356, 401–402, 351, 466, 468
See application file for complete search history.

(56) References Cited

U.S. PATENT DOCUMENTS

| 4,692,918 A | 9/1987 | Elliott et al. |
|---|---|---|
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,371,852 A | 12/1994 | Attanasio et al. |
| 5,473,599 A | 12/1995 | Li et al. |
| 5,572,528 A | 11/1996 | Shuen |

(Continued)

FOREIGN PATENT DOCUMENTS

WO    03/043226 A1    5/2003

OTHER PUBLICATIONS

T. Li, B. Cole, P. Morton, and D. Li, "*Cisco Hot Standby Router Protocol (HSRP)*," Mar. 1998, Network Working Group RFC 2281 (http://ftp.ietf.org/rfc/rfc2281.txt?number=2281).

(Continued)

*Primary Examiner*—Melody Mehrpour
(74) *Attorney, Agent, or Firm*—Weaver Austin Villeneuve & Sampson LLP (57) ABSTRACT

Methods and apparatus for registering a mobile device such as a mobile node or mobile router with a Home Agent in an asymmetric link environment. A Foreign Agent associates each of one or more interfaces of the Foreign Agent with a different care-of address. An agent advertisement including the care-of address for the one or more interfaces of the Foreign Agent is then sent via one or more uplinks. A registration request is received via a downlink router. The registration request identifies a care-of address associated with one of the one or more interfaces of the Foreign Agent. One of the interfaces identified by the care-of address is ascertained, thereby identifying the interface to which the mobile device has roamed. The registration request is forwarded to the Home Agent. A registration reply is received from the Home Agent. The registration reply is then forwarded to the mobile device via the ascertained interface.

21 Claims, 5 Drawing Sheets

U.S. PATENT DOCUMENTS

| | | | |
|---|---|---|---|
| 5,572,582 | A | 11/1996 | Riddle |
| 5,619,552 | A | 4/1997 | Karppanen et al. |
| 5,729,537 | A | 3/1998 | Billström |
| 5,793,762 | A | 8/1998 | Penners et al. |
| 5,825,759 | A | 10/1998 | Liu |
| 5,862,345 | A | 1/1999 | Okanoue et al. |
| 6,078,575 | A | 6/2000 | Dommety et al. |
| 6,130,892 | A | 10/2000 | Short et al. |
| 6,160,804 | A | 12/2000 | Ahmed et al. |
| 6,195,705 | B1 | 2/2001 | Leung |
| 6,230,012 | B1 | 5/2001 | Willkie et al. |
| 6,339,830 | B1 | 1/2002 | See et al. |
| 6,370,142 | B1 | 4/2002 | Pitcher et al. |
| 6,393,482 | B1 | 5/2002 | Rai et al. |
| 6,407,988 | B1 | 6/2002 | Agraharam et al. |
| 6,434,134 | B1 | 8/2002 | La Porta et al. |
| 6,473,411 | B1 | 10/2002 | Kumaki et al. |
| 6,487,406 | B1 | 11/2002 | Chang et al. |
| 6,490,285 | B2 | 12/2002 | Lee et al. |
| 6,510,153 | B1 | 1/2003 | Inoue et al. |
| 6,512,754 | B2 | 1/2003 | Feder et al. |
| 6,515,974 | B1 | 2/2003 | Inoue et al. |
| 6,535,493 | B1 | 3/2003 | Lee et al. |
| 6,549,522 | B1 | 4/2003 | Flynn |
| 6,560,217 | B1 | 5/2003 | Peirce et al. |
| 6,567,664 | B1 | 5/2003 | Bergenwall et al. |
| 6,571,289 | B1 | 5/2003 | Montenegro |
| 6,587,882 | B1 | 7/2003 | Inoue et al. |
| 6,606,316 | B1 | 8/2003 | Albert et al. |
| 6,629,137 | B1 | 9/2003 | Wynn |
| 6,633,761 | B1 | 10/2003 | Singhai et al. |
| 6,636,498 | B1 | 10/2003 | Leung |
| 6,697,360 | B1 | 2/2004 | Gai et al. |
| 6,731,621 | B1 | 5/2004 | Mizutani et al. |
| 6,738,362 | B1 * | 5/2004 | Xu et al. ............. 370/329 |
| 6,747,961 | B1 | 6/2004 | Ahmed et al. |
| 6,766,168 | B1 | 7/2004 | Lim |
| 6,804,221 | B1 * | 10/2004 | Magret et al. ......... 370/338 |
| 6,842,462 | B1 | 1/2005 | Ramjee et al. |
| 6,862,274 | B1 | 3/2005 | Tsao et al. |
| 6,892,069 | B1 | 5/2005 | Flynn |
| 6,904,025 | B1 | 6/2005 | Madour et al. |
| 6,944,181 | B2 | 9/2005 | Inoue et al. |
| 6,954,790 | B2 | 10/2005 | Forslow |
| 6,959,341 | B1 | 10/2005 | Leung |
| 6,970,459 | B1 | 11/2005 | Meier |
| 6,973,057 | B1 | 12/2005 | Forslow |
| 6,973,309 | B1 | 12/2005 | Rygula et al. |
| 6,988,146 | B1 | 1/2006 | Magret et al. |
| 7,079,499 | B1 * | 7/2006 | Akhtar et al. ......... 370/310 |
| 7,107,620 | B2 | 9/2006 | Haverinen et al. |
| 7,155,518 | B2 | 12/2006 | Forslow |
| 7,218,634 | B1 | 5/2007 | Khalil et al. |
| 7,295,551 | B1 | 11/2007 | Leung et al. |
| 7,346,053 | B1 | 3/2008 | Leung et al. |
| 7,352,731 | B1 | 4/2008 | Leung |
| 2001/0022781 | A1 * | 9/2001 | Makipaa ............... 370/316 |
| 2001/0041571 | A1 * | 11/2001 | Yuan .................... 455/445 |
| 2002/0075878 | A1 | 6/2002 | Lee et al. |
| 2002/0186693 | A1 | 12/2002 | Inoue et al. |
| 2003/0018715 | A1 | 1/2003 | O'Neill |
| 2003/0117965 | A1 | 6/2003 | Markki et al. |
| 2003/0174688 | A1 * | 9/2003 | Ahmed et al. ......... 370/349 |
| 2004/0013099 | A1 * | 1/2004 | O'Neill ................. 370/338 |

OTHER PUBLICATIONS

Release notes for 3Com Corporation, "*Conducting a Redundant Route for Network Resiliency*", Mar. 1994, *Net Builder Family Bridge/Router*, pp. 26-29.

J. Moy, RFC 1247 "OSPF Version 2", Jul. 19, 1991.

D. Oran, RFC 1142 "*OSI IS-IS Intra-domain Routing Protocol*", Feb. 1990.

Uyless Black, "*TCP/IP and Related Protocols*", 1992, *McGraw-Hill, Inc.*, pp. 226-249.

Chambless, et al., "*Home Agent Redundancy Protocol (HARP)*", Oct. 27, 1997.

Networking Working Group, RFC 2002 "*IP Mobility Support*", Oct. 1996.

C. Perkins, "*IP Mobility Support*", IBM Corporation, Oct. 1996.

"*Mobile IP*", Release 12.0 (1) T, pp. 1-55.

Montenegro, G., "*Reverse Tunneling for Mobile IP*", RFC 2344, Sun Microsystems, Inc., pp. 1-19, May 1998.

D. Harkins and D. Carrel, "*The Internet Key Exchange (IKE)*", Cisco Systems, pp. 1-33, Jun. 1998.

D. Cong, M. Hamlen and C. Perkins, "*The Definitions of Managed Objects for IP Mobility Support using SMIv2*", RFC 2006, Motorola and IBM, pp. 1-52, Oct. 1996.

C Finseth, "*An Access Control Protocol, Sometimes Called TACACS*", RFC 1492, pp. 1-15, Sep. 13, 1992.

D. Carrel and Lol Grant, "*The TACACS+ Protocol*", Network Working Group, Internet-Draft, Cisco Systems, pp. 1-42, Jan. 1997.

C. Rigney, "*RADIUS Accounting*", RFC 2139, Livingston, pp. 1-25, Apr. 1997.

C. Rigney, et al., "*Remote Authentication Dial in User Service (RADIUS)*", RFC 2138, pp. 1-65, Apr. 1997.

K. Leung et al, U.S. Appl. No. 10/141,600, filed May 7, 2002, "Methods and Apparatus For Supporting IP Multicast For a Mobile Router."

K. Leung et al, U.S. Appl. No. 09/752,884, filed Dec. 28, 2000, "Support Mobile Device In Asymmetric Link Environment."

K. Leung, U.S. Appl. No. 09/746,409, filed Dec. 20, 2000, "Dynamic Network Allocation For Mobile Router."

Office Action dated Jan. 11, 2008 from related U.S. Appl. No. 11/213,590, 13 pgs.

Office Action dated Jul. 17, 2008 from related U.S. Appl. No. 11/213,468, 24 pgs.

Office Action dated Aug. 21, 2008 from related U.S. Appl. No. 11/213,590, 14 pgs.

C. Perkins RFC 2002, Oct. 1996 IETF.

Office Action dated Jan. 6, 2009 from related U.S. Appl. No. 11/213,468, 18 pgs.

* cited by examiner

SUPPORT MOBILE DEVICE IN ASYMMETRIC LINK ENVIRONMENT

RELATED APPLICATIONS

This application is a continuation of application Ser. No. 09/752,884, entitled "SUPPORT MOBILE DEVICE IN ASYMMETRIC LINK ENVIRONMENT," by Leung et al, filed on Dec. 28, 2000, which is incorporated herein by reference for all purposes.

CROSS REFERENCE TO RELATED APPLICATIONS

This invention is related to U.S. patent application Ser. No. 09/227,396, naming Kent K Leung as inventor, and entitled "MOBILE IP MOBILE ROUTER." That application is incorporated herein by reference in its entirety and for all purposes.

BACKGROUND OF THE INVENTION

1. Field of the Invention

The present invention relates to Mobile IP network technology. More particularly, the present invention relates to enabling Mobile IP functionality for a router in an asymmetric link environment.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP: The Internet Unplugged" by J. Solomon, Prentice Hall. Both of these references are incorporated herein by reference in their entireties and for all purposes.

Figure 1:
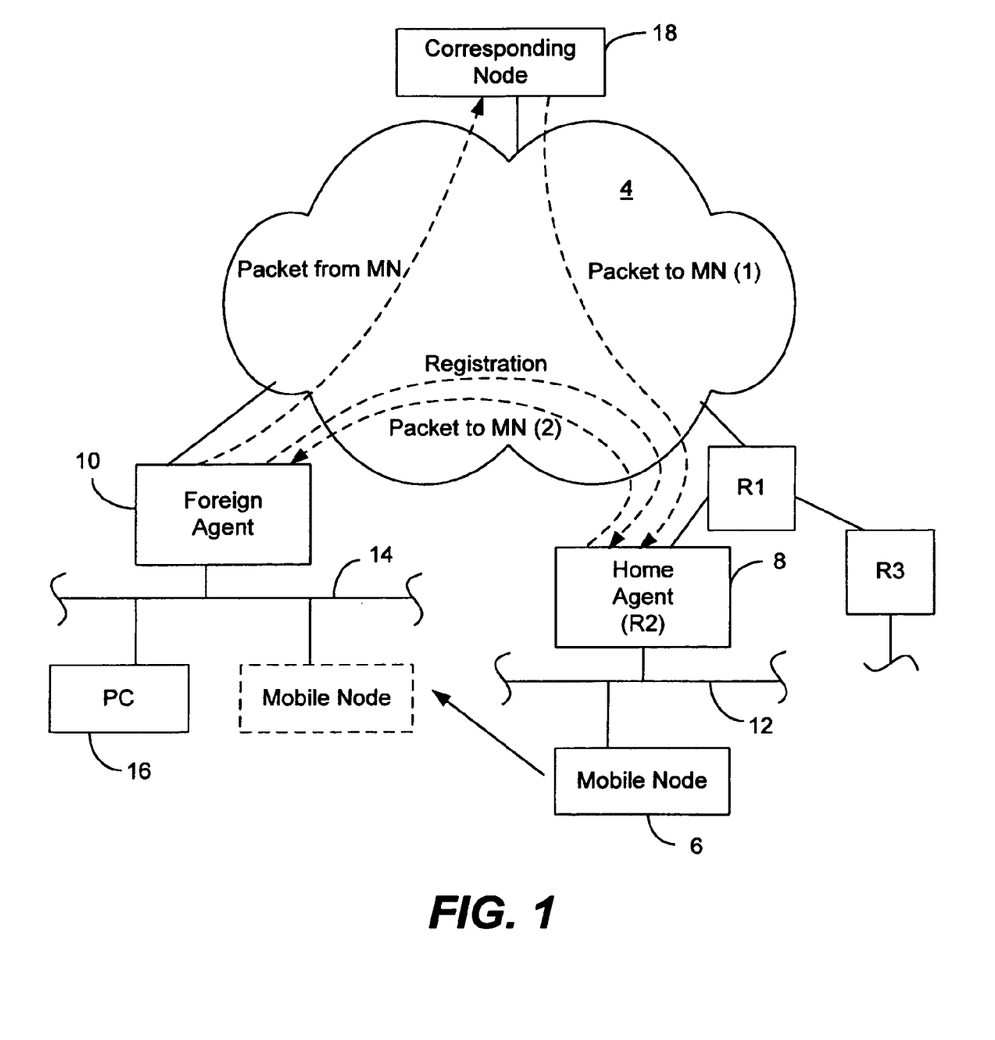
FIG. 1 is a diagram of a Mobile IP network segment and associated environment.

The Mobile IP process and environment are illustrated in FIG. 1A As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

In addition to providing connectivity to a mobile node, it may be desirable to provide for the mobility of one or more networks moving together, such as on an airplane or a ship. For instance, each plane may have a mobile router (and therefore many networks) on board to provide Internet connectivity and services. RFC 2002 section 4.5 discusses the possibility of implementing mobile routers.

It is important to note that Mobile IP assumes a symmetric control and data link. However, links are not always symmetrical. For instance, satellites provide an asymmetric link. In other words, control and data may flow in only one direction to or from a satellite. As described above, registration assumes a symmetric link environment in which control and data flows in both directions during the registration process. Thus, the standard Mobile IP protocol will not function properly in an asymmetric link environment.

In view of the above, it would be beneficial if a mechanism for enabling Mobile IP functionality in an asymmetric link environment could be implemented. Moreover, it would be desirable if such a mechanism could be implemented to enable a mobile router or mobile node to roam in an asymmetric link environment.

SUMMARY OF THE INVENTION

The present invention enables a mobile device such as a mobile router to register with a Home Agent in an asymmetric link environment. This enables a mobile router to roam to various Foreign Agents within an asymmetric link environment while receiving messages from corresponding nodes.

In accordance with one aspect of the invention, a Foreign Agent associates each of one or more uplink interfaces of the Foreign Agent with a different care-of address. An agent advertisement including the care-of address for the one or more interfaces of the Foreign Agent is then sent via one or more uplinks. A registration request is received via a downlink router. The registration request identifies a care-of address associated with one of the one or more interfaces of the Foreign Agent. One of the interfaces identified by the care-of address is ascertained, thereby identifying the interface (i.e., receiving interface) to which the mobile device (e.g., mobile router) has roamed. The registration request is forwarded to the Home Agent. A registration reply is received from the Home Agent. The registration reply is then forwarded to the mobile device via the ascertained interface.

In accordance with another aspect of the invention, a downlink router forwards a Mobile IP registration request in an asymmetric link environment. The downlink router receives a registration request composed and sent by a mobile device (e.g., mobile router), the registration request identifying a care-of address associated with one of one or more uplink interfaces of a Foreign Agent. The downlink router then forwards the registration request to the Foreign Agent, thereby enabling the Foreign Agent to process the registration request and forward a registration reply to the mobile device via the appropriate uplink interface.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 2:
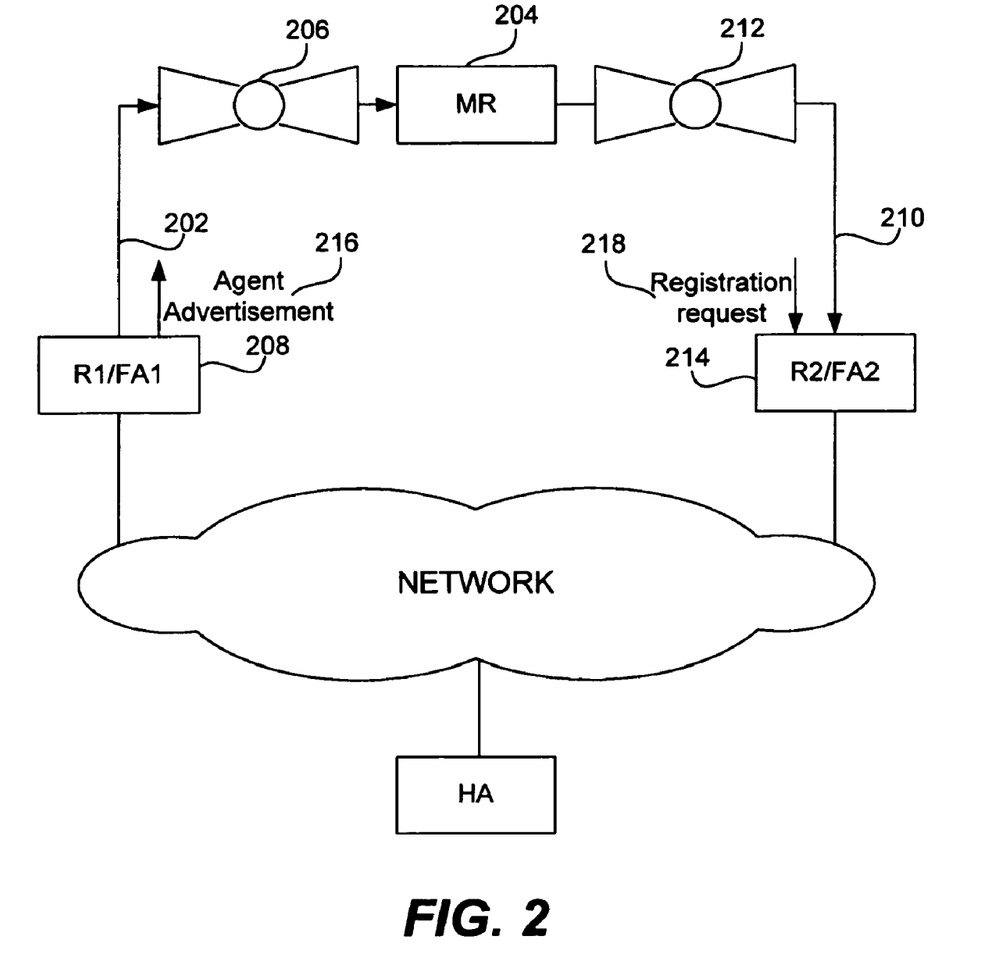
FIG. 2 is a diagram illustrating an asymmetric link environment and the problems that arise during registration in an asymmetric link environment.

The present invention enables mobility of a mobile device such as a mobile node or mobile router in an asymmetric link environment. One example of an asymmetric link environment includes satellites and satellite links. FIG. 2 is a diagram illustrating an asymmetric link environment and the problems that can arise during registration in an asymmetric link environment. As shown, an uplink 202 to a mobile router 204 via one satellite 206 from a first router 208 (e.g., Foreign Agent) allows communication solely upward from the first router 208 to the satellite 206. Similarly, a downlink 210 from another satellite 212 to a second router 214 (e.g., Foreign Agent) allows communication solely downward from the mobile router 204 via the second satellite 212 to the second router 214.

As described above, during registration in a symmetric link environment, a Foreign Agent (e.g., the first router R1 208) sends an agent advertisement to the mobile router that includes a care-of address of the Foreign Agent. In this manner, the mobile router learns the identity of the Foreign Agent to which it has roamed, and provides this care-of address in a registration request to its Home Agent so that the Home Agent also knows the location of the mobile router. However, in an asymmetric link environment, agent discovery and registration cannot be performed on the same link. Thus, the first Foreign Agent 208 periodically sends agent advertisements 216 advertising its care-of address via the uplink 202. However, the link layer will not allow the mobile router 204 to send a registration request directly to the first Foreign Agent 204. Thus, the mobile router 204 sends a registration request 218 identifying the advertised care-of address of the first Foreign Agent 208 via the downlink 210. Since the registration request is sent via the downlink 210, the router that receives the registration request may not be the Foreign Agent that sent the agent advertisements. For instance, in this example, the second router 214 receives the registration request. However, the destination address is the care-of address of the first Foreign Agent 208. The second router 214 may not be a Foreign Agent and therefore may be incapable of forwarding the registration request to the first Foreign Agent to which the registration request is directed. Moreover, since RFC 2002 requires that the time to live (TTL) field of the registration request be equal to 1, the registration request must be sent directly to the Foreign Agent rather than forwarded by an intermediate router. Even if the second router 214 is a Foreign Agent, the registration request identifies a specific care-of address. It is important to note that the Foreign Agent receiving the registration request typically checks that the care-of address is the care-of address of the receiving Foreign Agent. Since the care-of address will not be that of the receiving Foreign Agent, registration will not be performed as desired. In addition, registration service options supported by the first Foreign Agent such as the lifetime of the mobile router will not be supported on the second Foreign Agent. Even if the second Foreign Agent could perform registration of the mobile router, the satellite link 210 prevents sending a registration reply directly to the mobile router 204. In addition, assuming that the second Foreign Agent receives the registration request and enters an entry in a pending registration request list, the Home Agent will send the registration reply to the care-of address, and therefore the first Foreign Agent will receive the registration reply. However, since the first Foreign Agent is unaware of the pending registration request, it will be unable to complete the registration process.

Figure 3:
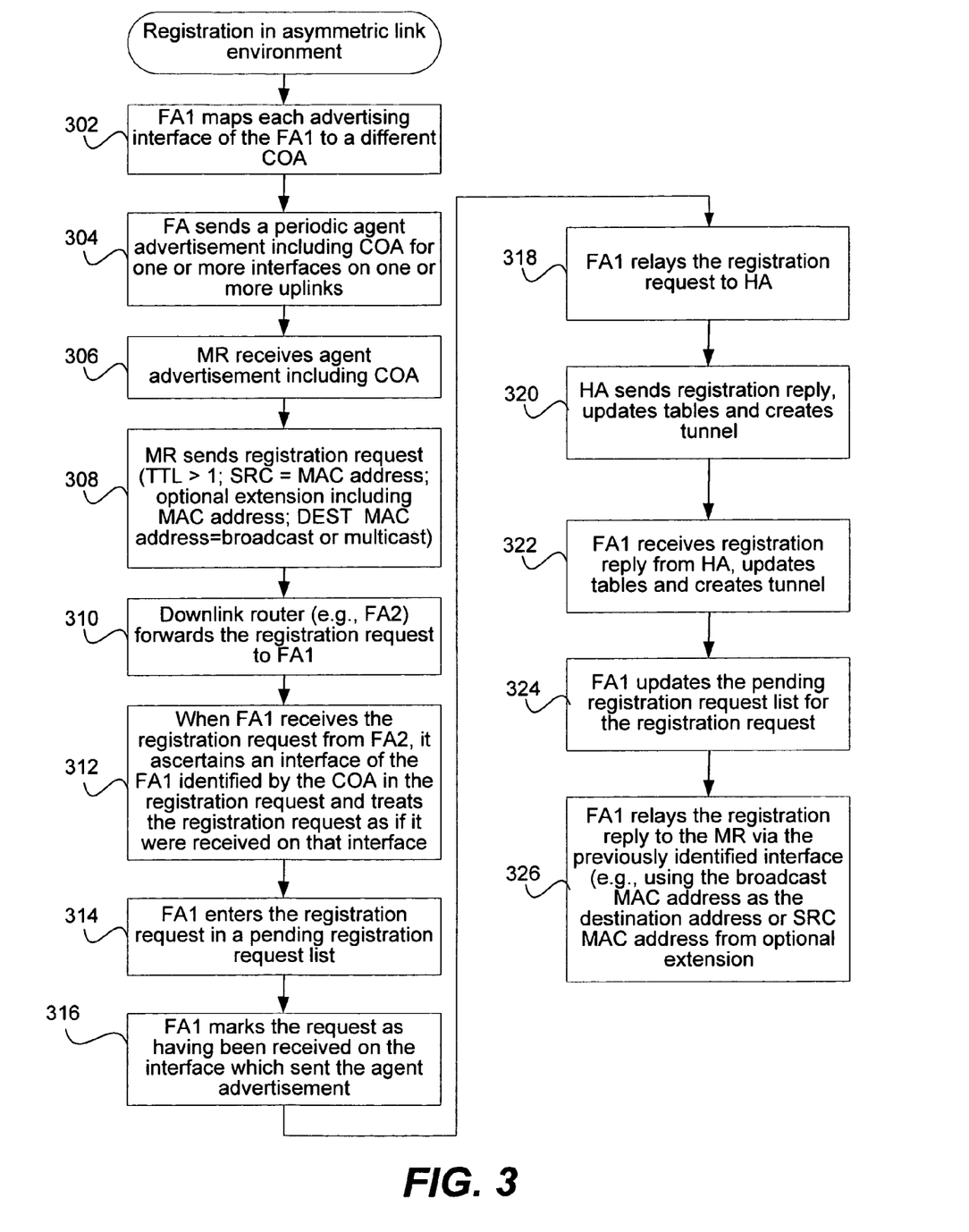
FIG. 3 is a process flow diagram illustrating one method of performing registration in an asymmetric link environment in accordance with one embodiment of the invention.

FIG. 3 is a process flow diagram illustrating one method of performing registration in an asymmetric link environment in accordance with one embodiment of the invention. At block 302, a first Foreign Agent maintains an association between each of one or more interfaces of the first Foreign agent with a different care-of address. For instance, the first Foreign Agent may map each advertising interface to a different care-of address. Next, at block 304 the first Foreign Agent sends a periodic agent advertisement including the care-of address for the one or more interfaces of the Foreign Agent via one or more uplinks. The mobile router receives an agent advertisement including the care-of address for one of the interfaces at block 306. The mobile router then composes and sends a registration request packet at block 308. More particularly, the registration request packet identifies a care-of address associated with one of the interfaces of the Foreign Agent. However, the destination MAC address cannot be the Foreign Agent's MAC address since the registration request must be received by a downlink router. Since the mobile router is sending the registration request out a different interface than the received agent advertisement, the destination MAC address provided in a registration reply packet is a broadcast or multicast address rather than a unicast address. In addition, the registration request preferably includes a time to live (TTL) field having a value that is greater than one. This enables the registration request to be forwarded, rather than requiring that the registration request be sent directly to the intended Foreign Agent The Foreign Agent may be able to send packets to the mobile router using a broadcast MAC address. However, the Foreign Agent may want to direct the packets to the mobile router using a unicast MAC address. For example, the unicast MAC address may be used to more efficiently send data packets. In these instances, the source MAC address must be provided to the Foreign Agent so that packets (e.g., registration reply packets) may be sent or forwarded to the mobile router. In order to provide the source MAC address to the Foreign Agent, the registration request may also include an extension that includes the source MAC address of the receiving interface on the mobile router. Since the TTL field is greater than 1, this enables a downlink router (e.g., second Foreign Agent) to forward the registration request to the first Foreign Agent as shown at block 310, thereby enabling the first Foreign Agent to process the registration request and send a registration reply to the mobile router via the appropriate interface. It is important to note that the another router (e.g., second router) that forwards the registration request to the Foreign Agent (e.g., first Foreign Agent) preferably does not perform ingress filtering, and therefore does not recognize that the source IP address is topologically incorrect.

When the first Foreign Agent receives the registration request from the downlink router at block 312, it ascertains one of the interfaces identified by the care-of address provided in the registration request. This interface is identified as the interface to which the mobile router has roamed, and thereafter treated as if the registration request were received on that interface. The first Foreign Agent processes the registration request. For instance, as shown at block 314, the first Foreign Agent enters the registration request in a pending registration request list. The first Foreign Agent then marks the registration request as having been received on the interface advertising the care-of address at block 316. For instance the first Foreign Agent may indicate in a pending registration request list that the registration request has been received on the interface advertising the care-of address. The first Foreign Agent then relays the registration request to the Home Agent at block 318. The Home Agent then sends a registration reply to the first Foreign Agent, updates the appropriate tables (e.g., Mobility Binding Table) and creates a tunnel between the Home Agent and the mobile router at block 320. The first Foreign Agent receives the registration reply from the Home Agent, updates its tables (e.g., Visitor's Table) and creates a tunnel between the first Foreign Agent and the Home Agent at block 322. The first Foreign Agent updates the pending registration request list for the registration request at block 324 when the registration reply is received from the Home Agent. The first Foreign Agent then relays the registration reply to the mobile router via the previously identified interface at block 326. As described above with reference to block 308, the Foreign Agent may be able to reach the mobile router using a broadcast address. In these instances, the destination address in the registration reply is set to a broadcast MAC address. Alternatively, when the source MAC address is provided in an extension to the registration request, the registration reply is relayed using the source MAC address.

Figure 4:
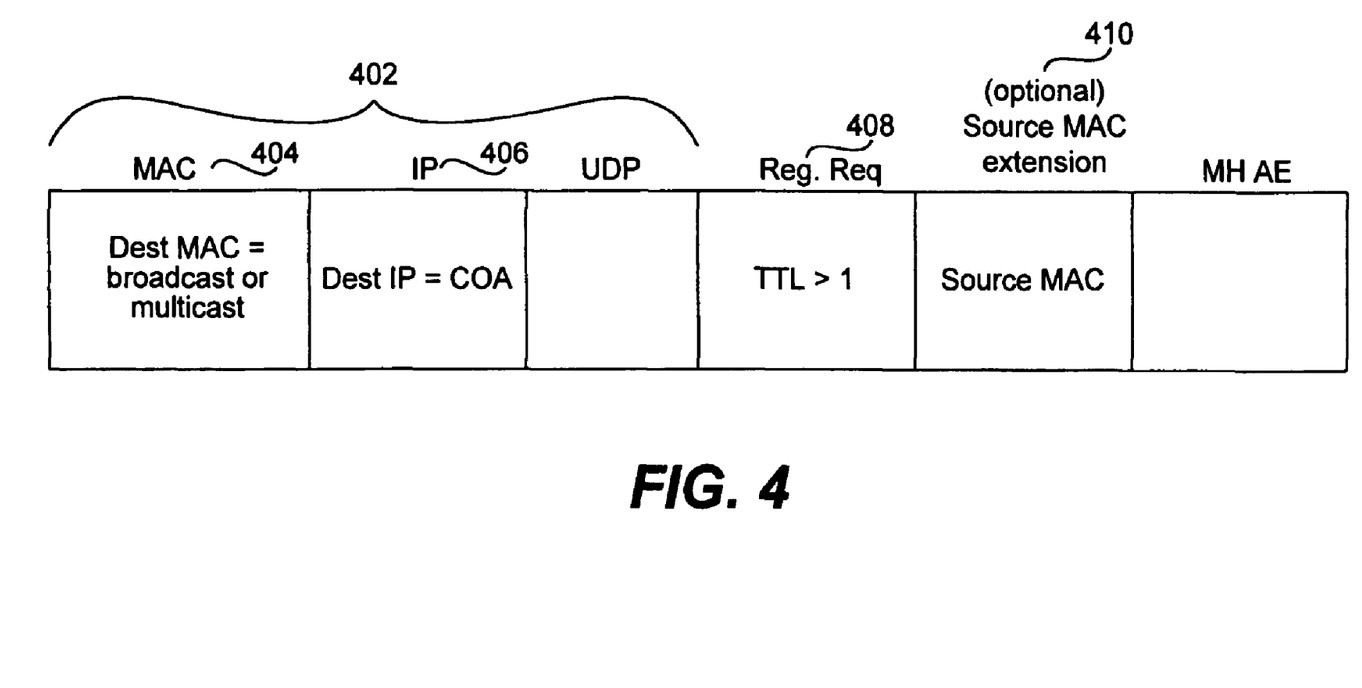
FIG. 4 is a diagram illustrating an exemplary registration request packet sent by a mobile device in accordance with one embodiment of the invention.

FIG. 4 is a diagram illustrating an exemplary registration request packet sent by a mobile device in accordance with one embodiment of the invention. As shown, a registration request packet sent by a mobile device such as a mobile router includes a header 402 that is directed to a destination MAC address 404 that is a broadcast or multicast address in accordance with one embodiment. Destination IP address 406 is the care-of address that is obtained from the agent advertisement previously sent by the Foreign Agent The registration request packet includes a time-to-live (TTL) field 408 that is greater than 1, enabling the registration packet to be forwarded to the Foreign Agent by an intermediate "downlink router." An optional extension 410 may be used to identify the source MAC address, enabling the Foreign Agent to use this source MAC address when forwarding the registration reply packet.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (forwarding router or Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the registration technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the registration systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 5:
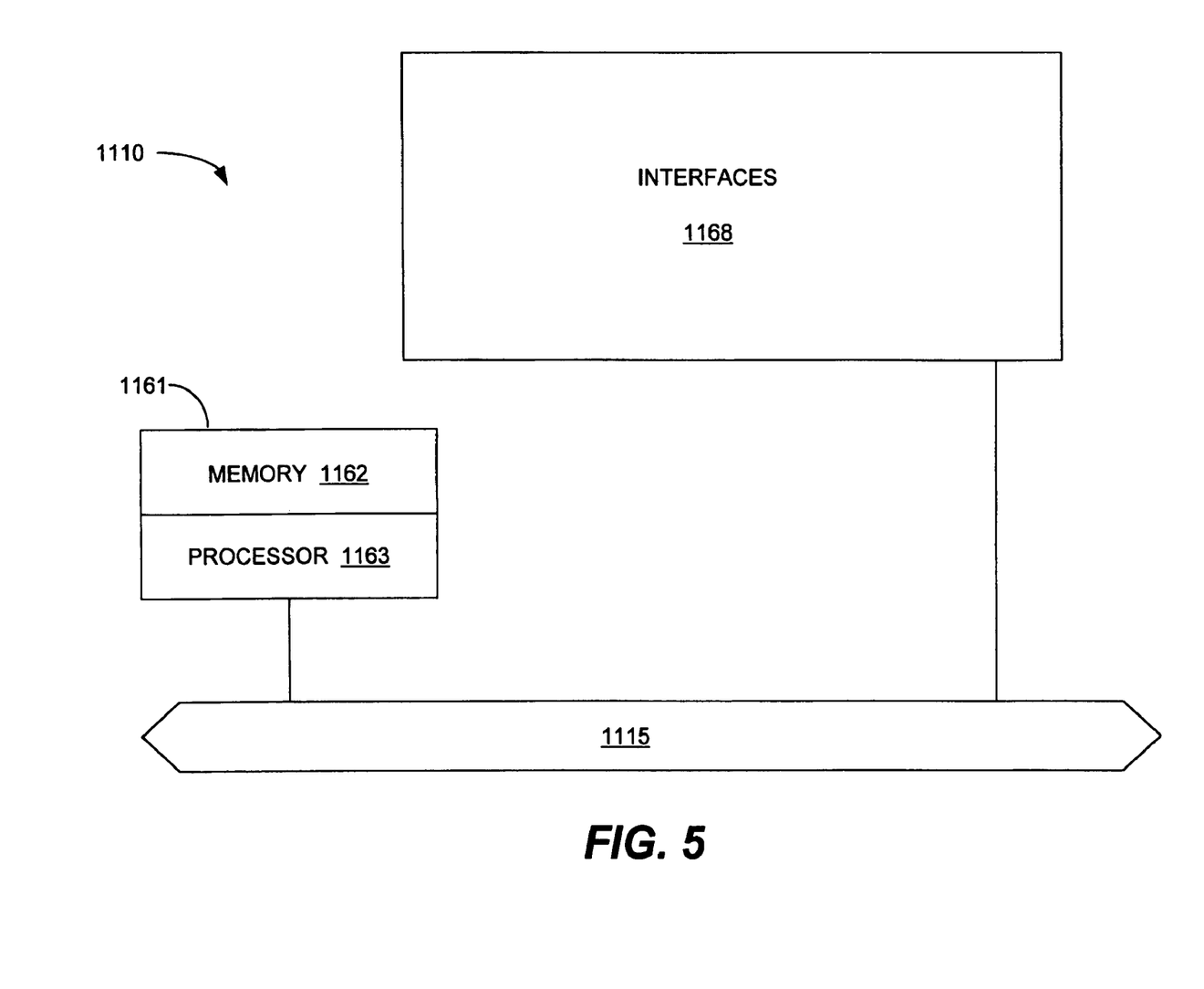
FIG. 5 is a block diagram of a network device that may be configured to implement aspects of the present invention.

Referring now to FIG. 5, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used Further, other types of interfaces and media could also be used with the router.

Regardless of network device's configuration, it may employ one or more memories or memory modules (including memory 1161) configured to store program instructions for the general-purpose network operations and mechanisms for registration and routing functions described herein. The program instructions may control the operation of an operating system and/or one or more applications, for example. The memory or memories may also be configured to store tables such as mobility binding and registration tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to nodes on remote network segments can be used as well. For example, bridges or other less intelligent packet switches may also employ the standby protocol of this invention. Moreover, although the present invention is described with reference to mobile routers, the present invention is also application to other mobile devices such as mobile nodes. Accordingly, the present embodiments are to be considered as illustrative and not restrictive, and the invention is not to be limited to the details given herein, but may be modified within the scope and equivalents of the appended claims.

What is claimed is:

1. A Foreign Agent that supports Mobile IP, the Foreign Agent being capable of registering a mobile device with a Home Agent in an asymmetric link environment, the Foreign Agent comprising:

a processor; and a memory, at least one of the processor or the memory being adapted for:

associating each one of a plurality of interfaces of the Foreign Agent with a different care-of address such that each of the plurality of interfaces is mapped to a different care-of address;

sending at least one agent advertisement including the care-of address for each of the plurality of interfaces of the Foreign Agent via one or more uplinks;

receiving a registration request forwarded via a downlink router, the registration request identifying a care-of address associated with only one of the plurality of interfaces of the Foreign Agent;

ascertaining the one of the plurality of interfaces identified by the care-of address in the registration request, thereby identifying the interface to which the mobile device has roamed;

forwarding the registration request to the Home Agent;
receiving a registration reply from the Home Agent; and
forwarding the registration reply to the mobile device via the ascertained interface.

2. The Foreign Agent as recited in claim 1, wherein the registration request further includes an extension including a source MAC address of the mobile device.

3. The Foreign Agent as recited in claim 2, wherein the registration reply includes a destination MAC address that is the source MAC address of the mobile device.

4. The Foreign Agent as recited in claim 1, wherein the registration request includes a destination IP address field having a value of the care-of address from the agent advertisement.

5. The Foreign Agent as recited in claim 1, at least one of the processor or the memory being further adapted for:
  entering the registration request in a pending registration request list; and
  updating the pending registration request list when the registration reply is received from the Home Agent.

6. The Foreign Agent as recited in claim 1, at least one of the processor or the memory being further adapted for:
  marking the registration request as having been received on the interface advertising the care-of address.

7. The Foreign Agent as recited in claim 6, wherein marking the registration request as having been received on the interface advertising the care-of address comprises:
  updating a pending registration request list to indicate that the registration request has been received on the interface advertising the care-of address.

8. The Foreign Agent as recited in claim 1, wherein the registration reply includes a destination MAC address that is a broadcast address.

9. The Foreign Agent as recited in claim 1, wherein the registration reply includes a destination MAC address that is a multicast address.

10. The Foreign Agent as recited in claim 1, wherein each of the plurality of interfaces has been assigned a different care-of address.

11. A downlink router adapted for forwarding a Mobile IP registration request in an asymmetric link environment, comprising:
  a processor; and
  a memory, at least one of the processor or the memory being adapted for:
    receiving a registration request composed and sent by a mobile device, the registration request identifying a care-of address associated with only one of a plurality of interfaces of a Foreign Agent, wherein each of the plurality of interfaces of the Foreign Agent has a different care-of address; and
  forwarding the registration request to the Foreign Agent, thereby enabling the Foreign Agent to process the registration request and forward a registration reply to the mobile device via the interface.

12. The downlink router as recited in claim 11, wherein the mobile device includes a router.

13. The downlink router as recited in claim 11, wherein the mobile device is a mobile node supporting Mobile IP.

14. The downlink router as recited in claim 11, wherein the registration request includes a time to live field having a value that is greater than one.

15. The downlink router as recited in claim 11, wherein the downlink router is a Foreign Agent.

16. The downlink router as recited in claim 11, wherein the asymmetric link environment includes one or more satellites.

17. The downlink router as recited in claim 11, wherein the registration request further includes an extension including a source MAC address of the mobile device.

18. The downlink router as recited in claim 11, wherein the registration request includes a destination IP address field having a value of the care-of address.

19. The downlink router as recited in claim 11, wherein the registration request is sent using a destination MAC address that is a broadcast or multicast MAC address.

20. The downlink router as recited in claim 11, wherein each of the plurality of interfaces has been assigned a different care-of address.

21. A downlink router adapted for forwarding a Mobile IP registration request in an asymmetric link environment, comprising:
  means for receiving a registration request composed and sent by a mobile device, the registration request identifying a care-of address associated with only one of a plurality of interfaces of a Foreign Agent, wherein each of the plurality of interfaces of the Foreign Agent has a different care-of address; and
  means for forwarding the registration request to the Foreign Agent, thereby enabling the Foreign Agent to process the registration request and forward a registration reply to the mobile device via the interface.

* * * * *